United States Patent [19]

Singer

[11] 4,274,770
[45] Jun. 23, 1981

[54] HAND-HELD BURR REMOVER FOR CONDUIT AND PIPE

[75] Inventor: Karl Singer, 2282 Thorntree, Palatine, Ill. 60067

[73] Assignees: Karl Singer, Palatine; Wagner & Aubel, Ltd., Chicago, both of Ill.

[21] Appl. No.: 93,026

[22] Filed: Nov. 9, 1979

[51] Int. Cl.³ .............................................. B23D 79/00
[52] U.S. Cl. ...................................... 408/211; 30/172
[58] Field of Search ........................ 30/169, 172, 300; 408/211, 212, 213, 227, 228

[56] References Cited

U.S. PATENT DOCUMENTS

| | | | |
|---|---|---|---|
| 3,232,145 | 2/1966 | Wilson | 408/211 X |
| 3,763,510 | 10/1973 | Graham | 408/211 X |
| 3,870,432 | 3/1975 | Strybel | 408/211 X |
| 3,976,388 | 8/1976 | Webb | 408/211 |

Primary Examiner—Jimmy C. Peters
Attorney, Agent, or Firm—Robert E. Wagner; Gerald T. Shekleton; Wagner & Aubel

[57] ABSTRACT

A tool for deburring conduit and other piping is described. The tool is cylindrical with a stepped bore, having cutting blades mounted on each landing. Each succeeding bore is of a diameter that corresponds to a standard size of conduit. When the leading edges of a length of conduit is inserted to make contact with the cutting blades and rotated, the burrs are removed.

5 Claims, 4 Drawing Figures

HAND-HELD BURR REMOVER FOR CONDUIT AND PIPE

BACKGROUND OF THE INVENTION

This application relates to a tool for use in preparing conduit for housing electrical wiring, and more particularly, a tool for deburring thin wall conduit prior to the insertion of electrical wires.

When attending to the wiring of a house and the like in the construction trade, thin wall conduit has traditionally been the favored manner of housing the wiring within the walls. The general practice has been to cut the conduit to the necessary size and form it to follow a desired path, being connected either to other conduits or to electrical boxes where connections of the wires may be made to switches, lamps or the like. When a conduit is cut to size in such a process, whether it be by hacksaw or tubing cutter, a rough edge of burrs is generally formed on the interior edge of the cut of the conduit. It becomes necessary to eliminate these burrs prior to the assembling of the conduit to another conduit or to an electrical box. Should the burrs not be removed in some manner, when the wire is drawn through the conduit, leading in from one electrical box and exiting from another electrical box to supply or control power as desired, the burrs remaining on the inside edge of the conduit will scrape against the plastic insulation sheathing of the wire, thereby exposing the wire. Such damage is generally unnoticeable within the conduit. Since the damage remains outside the viewing area of the electrician, such a defect may come to light only after the entire system is installed and connected to power. When the power is turned on a short may occur should the exposed wire be in contact with the metal wall of the conduit.

Such a potentially dangerous situation therefore must be corrected, preferably prior to experiencing a short. Generally, the situation is avoided by filing the cut ends of the conduit or otherwise deburring such ends prior to assembly and pulling the wire through. Various tools have become available for such deburring action. Generally such tools are simple homemade devices which have been converted from another tool. As a result, while such tools may remove the unwanted burrs, there is not much efficiency in their use. Further, it is often necessary to utilize conduits of different outside diameters, the most common being ½ inch, and ¾ inch O.D. In order to have the capability of properly and quickly deburring each of these conduit sizes, one must have different deburring tools properly sized for each conduit diameter. Not only do three separate deburring tools add to the expenses of a workman's tool kit, but it becomes inconvenient and impractical to retain three such deburring tools within reach at all times. In addition, valuable space is consumed within the workman's toolbox.

Therefore, an object of the subject invention is the provision of a deburring tool which will accommodate a plurality of conduit sizes and effectively deburr conduits of each size.

Another object of the subject invention is a deburring tool used for deburring a plurality of conduit sizes while being capable of being retained within easy and convenient reach for the workman.

A still further object of the invention is a deburring tool capable of deburring a plurality of conduit sizes while needing only a minimum of space in the workman's toolbox.

SUMMARY OF THE INVENTION

These and other objects are attained in accordance with the present invention wherein there is provided a deburring tool which will deburr a plurality of sizes of conduits. The tool of the subject invention comprises a generally cylindrical object which is hollowed out in its interior central portion. This central portion becomes progressively smaller, stepping down to landings of different internal diameters for deburring conduits of different diameters on each landing. On each step or landing is a deburring knife edge or the like which will accept a conduit of a certain diameter. When the entire cylinder of the subject invention is rotated when in contact with an end of a conduit, the interior blade will effectively deburr the conduit end. By providing the cutting means on each landing, the conduit sizes equal to the internal diameter of each landing may be deburred.

DESCRIPTION OF THE DRAWINGS

The invention will be described with reference to the accompanying drawings wherein.

DESCRIPTION OF A PREFERRED EMBODIMENT

Figure 1:
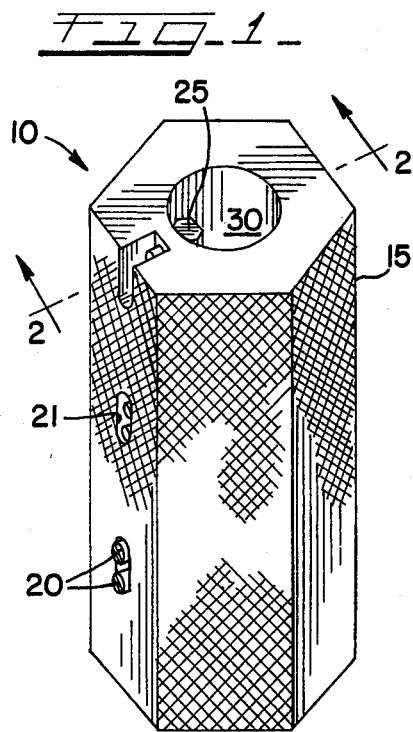
FIG. 1 is a prespective view of the deburring device of the subject invention.

Referring now to FIG. 1 there is shown the deburring device of the subject invention which includes a housing 15, which may be of metal or hard platic as desired. The housing 15 is generally in the shape of an elongated cylinder and may be gnurled or ridged for good gripping capability. As shown in the drawing, the preferred embodiment comprises an elongated polygon having a hollow interior 30. The polygonal shape adds significantly to the gripping capabilities for rotating the device, as will be explained.

Figure 2:
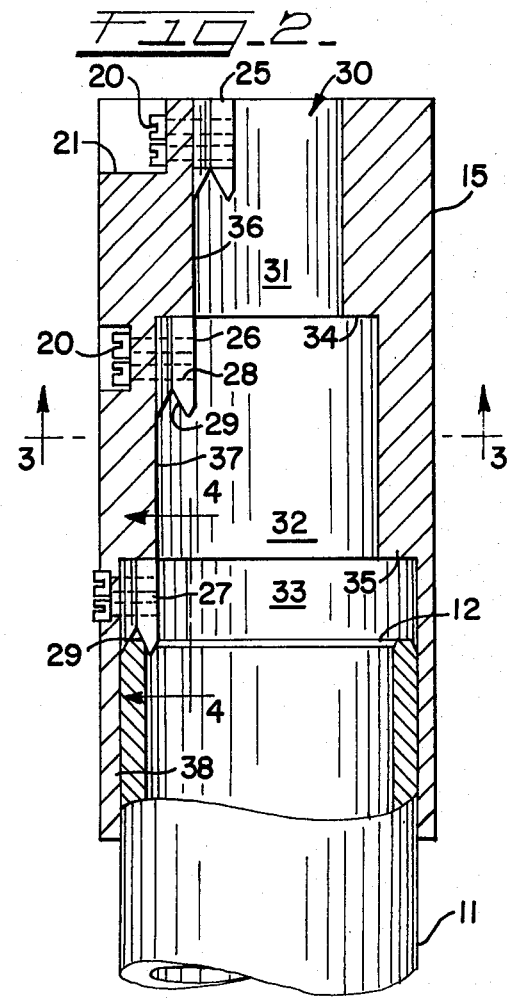
FIG. 2 is a cross-sectional view of the deburring device of the subject invention showing the internal knife blades in the central cavity of the subject invention.
Figure 4:
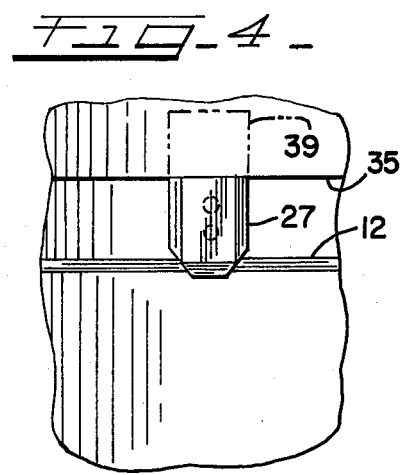
Figure 3:
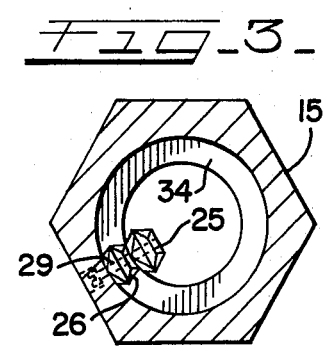
FIG. 3 is a cross-sectional view taken along the lines 3—3 of FIG. 2 showing a bottom plan view of the cutter blade; and, FIG. 4 is a side plan view taken along the lines 4—4 of FIG. 2 showing the cutting blade of the deburring device of the subject invention.

As shown in FIG. 2, cutters 25, 26 and 27 are secured to the walls 36, 37 and 38 respectively, of the interior chambers, all oriented in the same direction; that is, toward the opening of the largest chamber. Each cutting blade may be secured to the respective interior wall by a pair of screws 20 located in a recess 21 in the housing 15. Other means for securing the cutting blade rigidly to the interior wall 26 may be utilized as desired, such as insertion into a wall cavity 39, shown in FIG. 4. By securing the cutter body adjacent an interior wall surface and resting at least cutter blades 26 and 27 on shoulder ledges 34 and 35 respectively, minimal movement of the cutter blade will be experienced when in use, thereby contributing to the efficient deburring of a conduit length and a longer life of the subject invention. While the preferred embodiment of the subject invention has concentric interior chambers, the interior chambers may be arranged in any manner which allows access to the blade in each chamber.

The hollow interior deburring device may include one or more cutting blades in each chamber for limiting the rotation of the device in deburring the entire leading edge. For instance, if two blades are space 180° apart within a chamber, then rotation of only a half-circle need by attended to for deburring the entire leading edge.

One embodiment of the cutting blade itself is shown at 26 and comprises a generally elongated hexagonal piece having a V-shaped notch 29 at one end. As shown in FIG. 2, the screws 20 are mounted within threaded hole 28 of the body of the cutting blade 26. As the cutting blade is seated on the landing 34 and secured by two screws, little or no movement of the cutting blade within the deburring device 10 will be experienced. The side of the cutting blade adjacent the wall may be slightly rounded to conform to the wall for greater stability. The V-shaped notch 29 at one end accepts the leading edge of a conduit inserted into the device of the subject invention for the deburring process, as will be explained.

Each cutting edge 25 and 26 and 27 is placed within a chamber of the deburring device of the subject invention. Each succeeding chamber 31, 32 and 33 has inside diameters of standard size conduits. For example, chamber 31 might accept conduits of ½ inch; outside diameter chamber 32 may accept conduits of ⅝ inch outside diameter for insertion against the cutting blade 26; and, chamber 33 might accept conduits of ¾ inch outside diameter for insertion against the cutting blade 27.

By such an arrangement, it is possible to provide in one tool for the deburring of a plurality of sizes of conduits as the rotation of each size conduit is guided by having an internal diameter of the tool substantially the same as the outside diameter of the conduit to be deburred. All that is required to achieve the deburring of conduit 11 is the insertion of the leading edge 12 of a conduit until contact is achieved with the cutting blade, followed by rotation of the entire device 10.

To deburr a conduit prior to assembly, the conduit edge 12 is inserted into the chamber 33 and the V-shaped notch 29 of the cutting blade if the conduit were of the outside diameters corresponding to the size of opening 33. Because the size of the opening closely approximates a standard O.D. size, say ¾ inch, insertion of the leading edge 12 of the conduit automatically brings the leading edge 12 into contact with cutting knife 29. The housing 15 is rotated at least 360° and the conduit is deburred, leaving a rounded or tapered edge 12 on a conduit. As the deburring device has gripping means, such as being gnurled, or of a polygonal shape as in the drawings, rotation of the subject invention to deburr the leading edge of the conduit is accomplished without great effort or dexterity.

While the invention has been described with reference to a preferred embodiment, it will be understood by those skilled in the art that various changes may be made and equivalents may be substituted for elements therefore without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An apparatus for deburring leading edges of conduits and the like, said apparatus being capable of deburring conduits of a plurality of sizes, said apparatus including a plurality of successively smaller chambers, each communicating directly with adjacent chambers and being of a size approximating that of a standard size conduit, the largest of said chambers having an external opening, each chamber having a cutting means with a blade oriented towards said external opening, whereby the leading edges of any conduits of said standard sizes may be inserted into said external opening to engage one of said blades and be deburred upon the rotation of said apparatus relative to said conduit.

2. The apparatus of claim 1 wherein said plurality of chambers are concentric.

3. The apparatus of claim 1 wherein said cutting means are seated on landings for greater stability.

4. The apparatus of claim 1 wherein said cutting means comprises a V-shaped blade.

5. An apparatus for deburring leading edges of a metal conduit and the like having an elongated body;
    said body having a hollow interior formed of interior walls opened at one end;
    said walls forming successively smaller concentric internal diameters;
    a cutting means secured to said interior walls and associated with each of said concentric internal diameters;
    said cutting means including a blade oriented for contact with said leading edges of a conduit when inserted through said opening;
    said blade removing all burrs present on leading conduit edge upon rotation of said apparatus relative to said conduit.

* * * * *